(12) United States Patent
Ferrari

(10) Patent No.: US 8,742,922 B2
(45) Date of Patent: Jun. 3, 2014

(54) LUGGAGE TRACKING DEVICE

(71) Applicant: Tori Ferrari, Knoxville, TN (US)

(72) Inventor: Tori Ferrari, Knoxville, TN (US)

(73) Assignee: Tori Ferrari, Knoxville, TN (US)

( * ) Notice: Subject to any disclaimer, the term of this patent is extended or adjusted under 35 U.S.C. 154(b) by 0 days.

(21) Appl. No.: 13/896,882

(22) Filed: May 17, 2013

(65) Prior Publication Data

US 2013/0249673 A1    Sep. 26, 2013

Related U.S. Application Data

(63) Continuation-in-part of application No. 12/660,092, filed on Feb. 22, 2010, now abandoned.

(51) Int. Cl.
*G08B 1/08*    (2006.01)

(52) U.S. Cl.
USPC .............. 340/539.13; 340/573.1; 340/539.11; 340/8.1

(58) Field of Classification Search
USPC ................. 340/8.1, 572.1, 572.7, 571, 573.1, 340/573.4, 539.11, 539.13, 539.22, 1.1, 6.1
See application file for complete search history.

(56) References Cited

U.S. PATENT DOCUMENTS

| | | |
|---|---|---|
| 5,751,246 A | 5/1998 | Hertel |
| 6,265,975 B1 | 7/2001 | Zimmerman |
| 6,342,836 B2 | 1/2002 | Zimmerman |
| 6,353,390 B1 * | 3/2002 | Beri et al. .................. 340/572.1 |
| 7,916,025 B2 | 3/2011 | Locker et al. |
| 2001/0048364 A1 * | 12/2001 | Kalthoff et al. ............ 340/573.1 |
| 2006/0022090 A1 | 2/2006 | McCoskey et al. |
| 2008/0068171 A1 * | 3/2008 | Ehrman et al. ............. 340/572.1 |
| 2008/0158002 A1 * | 7/2008 | Parkinson et al. ........ 340/825.49 |
| 2009/0040101 A1 | 2/2009 | Ani et al. |

* cited by examiner

*Primary Examiner* — Anh V La
(74) *Attorney, Agent, or Firm* — Pitts & Lake, PC

(57) ABSTRACT

A luggage tracking device, and a method of tracking luggage using the device, the device including a housing configured to be attached to a piece of luggage, a location unit provided in the housing to determine a current location of the device, a transmitter provided in the housing to transmit current location information, and a controller provided in the housing to control operations of the location unit and transmitter.

20 Claims, 3 Drawing Sheets

LUGGAGE TRACKING DEVICE

CROSS-REFERENCE TO RELATED APPLICATIONS

This application is a Continuation-In-Part of U.S. application Ser. No. 12/660,092, filed Feb. 22, 2010.

FIELD OF INVENTION

The present general inventive concept relates generally to a luggage tracking device, and, more particularly, to an attachable device to communicate coordinates identifying a location of the luggage.

BACKGROUND

Air travel has become an increasingly more convenient and cost effective mode of travel over the last several decades, and, with the proliferation of such travel, there have been many advances in corresponding methods and technologies. Even airports themselves have been steadily evolving, offering more and more features and creature comforts to make the travel experience more enjoyable and satisfactory for the customer. However, with all of the advances of the past decades, there still exists the all too frequent incidents of lost luggage. Airlines scan bag tags to determine the location of the bag and match it up with the correct flight. However, one problem with this system is that it is dependent upon the workers' scanning each and every bag per flight, and this fails to occur far too often. Also, the airline industry of today, like many other companies, has gone through quite a bit of downsizing, resulting in less workers to perform the various jobs, making baggage service even slower and less accurate.

In some instances, a traveler may arrive at one destination while that traveler's luggage will arrive at another destination, and the traveler is inconvenienced by the delay in having his or her luggage returned. In other instances, the traveler's luggage may never be located. For example, in 2008 one major airline in the United States reported the permanent loss approximately 6.73 out of each 1,000 checked bags, a number that was up 40% from the previous year. In other words, the customers who checked those lost bags will never see their personal belongings again. Another major U.S. airline reported 10,000 bags missing per day. To make matters even worse, as TSA regulations tighten due to terrorism and other concerns, the amount of people checking luggage is increasing. Also, many pieces of luggage look alike, making it possible that someone may inadvertently pick up a bag from the baggage carousel that does not belong to them. Airlines may typically spend millions of dollars each year on locating and delivery of delayed or lost baggage. One airline reported an average expense of $50 for each delayed bag, and no one seems to have an answer regarding how to do the job better.

Typically, if an airline permanently loses a customer's luggage, the customer may recover up to $2,000 as compensation, but that customer will never recover the personal belongings. Thus, while the airline may compensate a traveler financially for lost luggage, many customers would understandably rather be able to locate their own lost luggage and the items contained therein. Therefore, it is desirable for the traveler to be able to conveniently track and/or locate his or her luggage outside of the system employed by the airlines and airports. As we move into a global information society, it is expected that the desire for improved baggage services advance with the information technology. Such a convenience as allowing real time updates regarding the luggage location sent from the luggage to the user would provide confidence to the traveling public.

BRIEF SUMMARY

The present general inventive concept provides a luggage tracking device, and a method of using such a device, to provide a user with real time updated information indicating where the luggage is currently located at various stops along a journey.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by a luggage tracking device including a housing configured to be attached to a piece of luggage, a location unit provided in the housing to determine a current location of the device, a transmitter provided in the housing to transmit current location information, and a controller provided in the housing to control operations of the location unit and transmitter.

The location unit may include a receiver configured to obtain Global Positioning System (GPS) information.

The location unit may include a receiver configured to obtain location information through a wireless communication with an external transmitter local to the device.

The receiver may communicate with the external transmitter through Bluetooth or Wi-Fi.

The controller may control the transmitter to transmit the current local information through a local and/or wide area network connection.

The luggage tracking device may further include a battery to provide power to the controller, transmitter, and location unit.

The housing may be configured to open to provide access to components located inside the housing.

The luggage tracking device may further include a coupling member to couple the device to the piece of luggage.

The coupling member may be configured to be locked and unlocked by a user.

The housing may include a transparent portion provided at least one side through which to display identification information.

The luggage tracking device may further include a storage to store user selected communication instructions.

The foregoing and/or other aspects and advantages of the present general inventive concept may also be achieved by a method of tracking luggage using a wireless luggage tracking device, the method including storing contact information in the luggage tracking device regarding a user selected mode of communication, determining current location information of the luggage tracking device, and transmitting the current location information to the user according to the selected mode of communication.

The determining of the current location information may occur at periodic intervals selected by the user.

The determining of the current location information may occur continuously.

The transmitting of the current location information may occur at periodic intervals selected by the user.

The transmitting of the current location information may occur in response to the luggage tracking device determining a change in the current location.

The method may further include transmitting the current location information to one or more airline systems.

The current location information may be transmitted by email, SMS text, automated telephone call, or any combination thereof.

The determining of the current location information may include receiving and processing GPS signals to determine longitude/latitude coordinates, a street address, an airport code, or any combination thereof.

The determining of the current location information may include receiving and processing location information from a local airport network to determine longitude/latitude coordinates, a street address, an airport code, or any combination thereof.

Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION

Reference will now be made to various example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The described progression of processing operations described are merely examples, however, and the sequence of operations is not limited to that set forth herein and may be changed as is known in the art, with the exception of operations necessarily occurring in a certain order. Also, description of well-known functions and constructions may be omitted for increased clarity and conciseness.

Various example embodiments of the present general inventive concept, as described herein, provide a luggage tracking device that is attachable to a piece of luggage and may be linked to a mobile device and/or computer to provide a user with real time or periodic updates as to the current location of the luggage. GPS technology may be employed to determine the location information, which gives the traveler confidence and improves the traveling experience by eliminating the stress of losing luggage.

According to various embodiments of the present general inventive concept, a luggage tracking device may be attached to a piece of luggage to periodically or continuously determine the current location of the luggage and send corresponding location information and/or alerts to the owner of the luggage, or the user. The current location information may be determined by, for example, GPS signals received and processed by the luggage tracking device. Such location information may then be sent to the user by any of a number of communication methods such as, for example, text message or other SMS service, email, user-accessible application updates, and so on.

Figure 1:
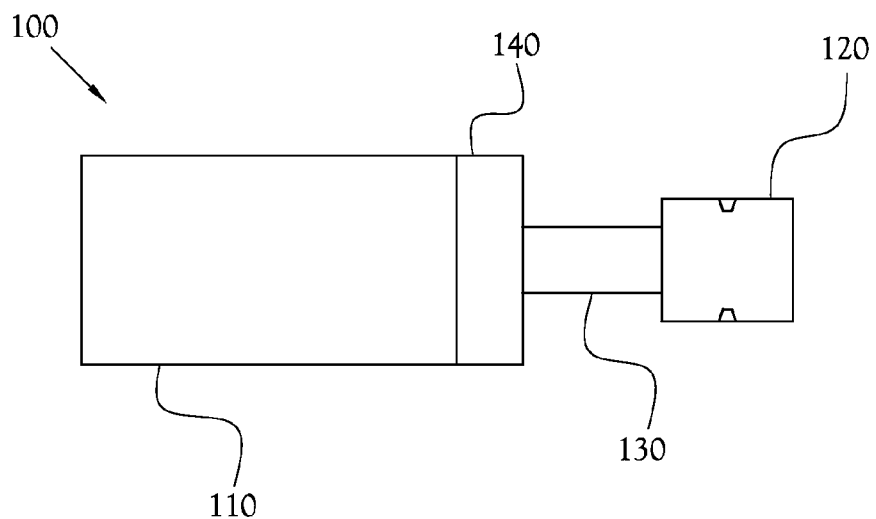
FIG. 1 illustrates a luggage tracking device according to an example embodiment of the present general inventive concept.

FIG. 1 illustrates a luggage tracking device according to an example embodiment of the present general inventive concept. The luggage tracking device 100 of FIG. 1 includes a housing 110 that is configured to be attached to a piece of luggage by a coupling member 120 that is configured to secure the luggage tracking device 100 to a handle, loop, or similar article of the luggage. The coupling member 120 may be configured in any number of ways, such as a lockable loop to surround a portion of the luggage, a clamp, or the like. In various other example embodiments, the housing 110 may be attached to the luggage in other ways, such as being sewn into the luggage, or simply placed inside the luggage, with or without the coupling member 120. In the example embodiment illustrated in FIG. 1, the coupling member 120 may be a lockable device provided to a coupling extension 130 extending from the housing 110 to the coupling member 120. The coupling extension 130 may be flexible such that the housing may be moved to access identification information without moving the entire piece of luggage. According to various example embodiments of the present general inventive concept, the coupling extension 130 may be integrated with the housing 110 and/or coupling member 120. For example, the coupling member 130 may have a first end fixed to the housing 110, and a second end that is attachable to the housing 110 such that the second end can be looped through a baggage handle before being attached to the housing 110 to secure the luggage tracking device 100 to the baggage. In other various example embodiments, the coupling extension 130 may interact with the coupling member 120 such that the coupling member 120 is lockable to the coupling extension 130 to secure the luggage tracking device 100 to the luggage. The housing 110 may include an opening portion 140 configured to open the housing so that the internal circuitry, battery, etc., may be accessed by the user. The opening portion 140 may be a snap-type closure which allows a hinged portion of the housing 110 to swing open, a partially sliding release to allow two halves of the housing 110 to be separated, or any other of a number of known housing latches, securing means, etc. It is understood that one or more of the components in FIG. 1 may be combined and/or omitted according to other various example embodiments of the present general inventive concept.

Figure 2:
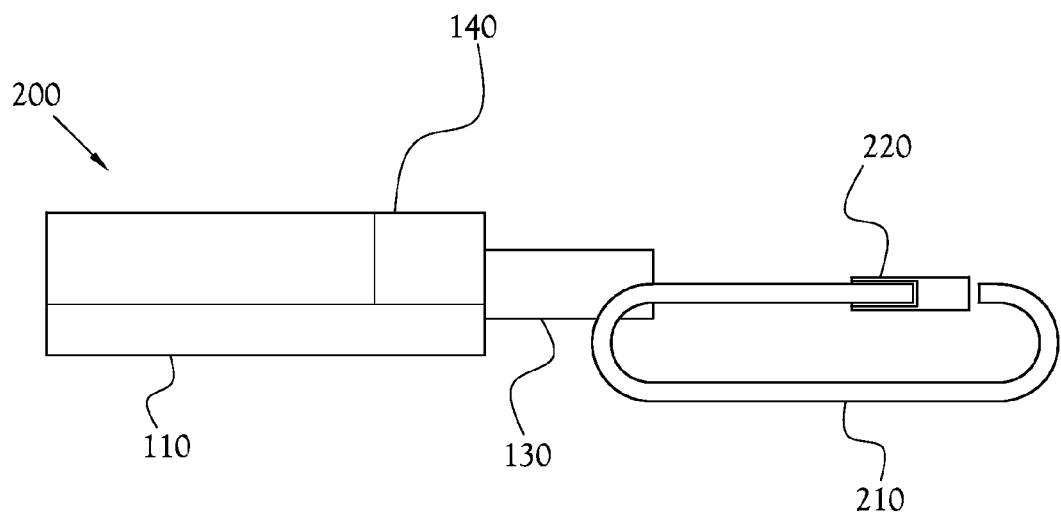
FIG. 2 illustrates a luggage tracking device according to another example embodiment of the present general inventive concept.

FIG. 2 illustrates a luggage tracking device according to another example embodiment of the present general inventive concept. The luggage tracking device 200 is similar to the luggage tracking device 100 illustrated in FIG. 1, but is provided with a loop 210 with a securing portion 220 that may be screwed open to attach the luggage tracking device 200 to the luggage, and then screwed close to prevent the luggage tracking device 200 from being removed from the luggage. The loop 210 may have an integrated dial-type lock.

Figure 3:
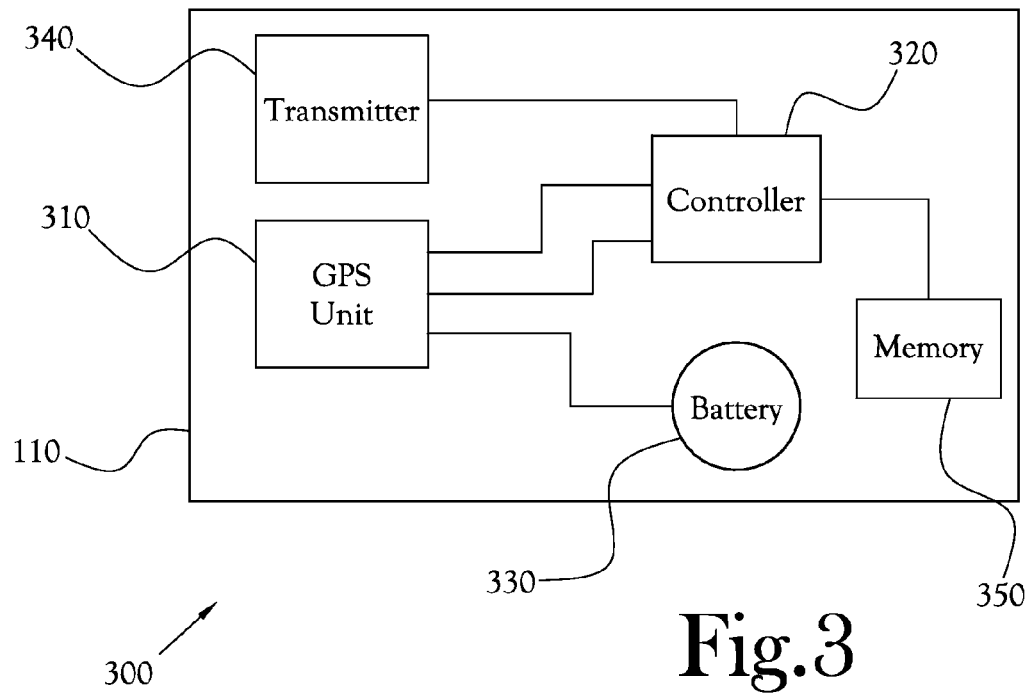
FIG. 3 illustrates a schematic layout of portions of a luggage tracking device according to an embodiment of the present general inventive concept.

FIG. 3 illustrates a schematic layout of portions of a luggage tracking device according to an embodiment of the present general inventive concept. As illustrated in FIG. 2, inside of the housing 110 of the luggage tracking device 300 is provided a GPS unit 310 to receive GPS signals, a controller 320 to process the GPS signals to determine current location information of the luggage tracking device 300 and to control various functions of the luggage tracking device 300, and a battery 330 to provide power to the luggage tracking device 300. The luggage tracking device 300 may further be provided with a transmitter 340 to transmit location information through a network to a user. The luggage tracking device 300 may further be provided with a memory 350 to store user information to aid in the communication between the luggage tracking device 300 and the user.

Figure 4:
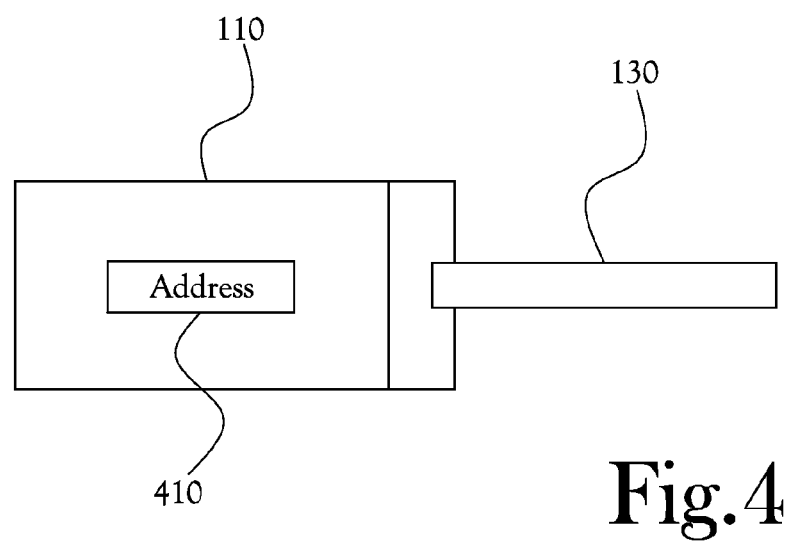
FIG. 4 illustrates a luggage tracking device according to yet another example embodiment of the present general inventive concept.

FIG. 4 illustrates a luggage tracking device according to yet another example embodiment of the present general inventive concept. In the example of FIG. 4, the housing 110 is provided with a display area 410 to display user information such as the user's address or any other information which can be used by the user and/or another party to identify the owner of the bag. The display area 410 may be provided in a number of ways according to various example embodiments. For example, the display area 410 may be a raised or attached portion which may accommodate an identification tag adhered to the display area 410, an area in which a user may write identification information directly, a clear window through which can be seen identification information that has been provided inside the housing 110, and so on.

Before checking the baggage that is to be tracked at the airport, the user may initialize the luggage tracking unit so that the luggage tracking unit transmits current location information to the user. According to various example embodiments, the luggage tracking unit may be provided with a data port to receive a wired connection to a user's computer, handheld device, or other processor. According to various other example embodiments, the luggage tracking unit may communicate wirelessly with the user's device to complete the initializing process. In an example embodiment, a user may download a program to the handheld device, and upon starting the program the handheld device may communicate with the luggage tracking unit wirelessly through, for example, a Wi-Fi connection, Bluetooth, or the like. The program may include a user interface through which the user enters a desired mode of communication through which the luggage tracking device will communicate the current location information to the user. For example, the user may instruct the luggage tracking device to send current location information to the user by email, automated telephone call, text, or the like, or a combination of two or more methods. The luggage tracking device may also transmit the current location information to the program stored on the user's handheld device, so that the user may access the information at the user's convenience. While various example embodiments are discussed herein as using a handheld device, it is understood that any such data processing device capable of receiving networked signals may be selected by the user to store and/or access the program and receive current location information, and the handheld device is described as a matter of convenience in several example embodiments herein.

The user may also instruct the luggage tracking device as to how often current location information updates should be provided. For example, the user may wish to receive current location information periodically, such as every half-hour, or may wish to receive current location information only when a change in location has been detected, and so on. Such operating instructions, communication addresses, etc., may be stored in a memory provided to the luggage tracking device. According to various example embodiments, the memory may be provided as a separate component from the controller, or may be integrated with the controller.

According to various example embodiments, the luggage tracking device may be provided with a physical on/off switch, or may be powered on and off through an interaction with the handheld device of the user.

The luggage tracking device may receive signals from GPS satellites on a constant or periodic basis to determine the current location of the luggage tracking device. The signals may be processed by the GPS unit of the luggage tracking device to determine longitude and latitude information and the resulting physical address, or a portion or all of the information may be transmitted to the controller for such processing. The longitude and latitude information may be used by the GPS unit and/or the processor to determine actual street locations and/or airport codes which are transmitted to the user, or the longitude and latitude information may be sent instead or in combination with the street address information. Upon determining the current location information, the controller of the luggage tracking device may transmit the current location information through a transmitter provided to the luggage tracking device. Thus, the current location information is sent to be accessed by the user without any prompting, inquiry, etc., by the user. The luggage tracking device may transmit the current location information to the user by accessing an available network connection directly, or through a local connection by Wi-Fi, Bluetooth, or the like, and may transmit the current location information to the user through email, text message, or the like.

The luggage tracking device may transmit the current location information to an application stored on the user's handheld device to be accessed by the user at his or her convenience. Further, according to the user's desire, the luggage tracking device can be configured to transmit the current location information to the airline through which the baggage is being transported, so that the baggage location information can be coupled to the user's itinerary. In that way, both the user and the airport may be constantly and/or periodically apprised of the location of the baggage. The luggage tracking device may be constantly monitoring changes in location, and in various example embodiments may transmit current location information at any change in location. In other various example embodiments, the luggage tracking device may be configured to only transmit current location information when the luggage tracking device determines that the current location is at or near an airport. The user's mobile device may also communicate with the luggage tracking device in a wireless fashion such that a user is notified an approximated distance between the mobile device and the luggage tracking to aid in identifying and picking up the luggage from an airport baggage carousel. In such example embodiments, the mobile device may compare location information pertaining to the mobile device with location information received from the luggage tracking device either continuously or at periodic intervals.

During some periods of transit, the luggage tracking device may not be able to receive GPS signals to determine the current location information. In various example embodiments of the present general inventive concept, the luggage tracking device may be configured to attempt to receive other types of signals to determine the current location information in absence of the GPS signals, or along with the reception of the GPS signals. For example, the luggage tracking device may not be able to receive GPS signals while in the cargo hold of a plane. During such periods, if no other types of location information signals are available, the luggage tracking device may attempt to transmit information to the user indicating that the current location information is not available. Such a message may include the last location information that was available.

As another example, when unloaded from a plane, the luggage tracking device may be able to receive information signals from the GPS satellites, and communicate such information to the user in the normal fashion. However, upon moving inside the airport, the luggage tracking device may again not be able to receive the satellite information. In such a case, according to various example embodiments, the luggage tracking device may attempt to receive Wi-Fi, Bluetooth, or other similar signals from one or more local networks in the airport to try and determine the current location information. This may be especially useful in the even that another person attempts to remove the user's bag from the baggage carousel, either by mistake or in an attempt to steal the bag. The user could then receive current location information indicating that the bag is being removed from the airport location, and the current location information of the bag. Also, accessing local networks at the airport may provide more detailed information that may be processed and communicated to the user, such as specific baggage carousels and the like.

It is noted that while the example embodiments discussed thus far have described baggage in a generic fashion, various example embodiments of the present general inventive concept may be used to track any type of luggage, pet carrier, cargo carrier, or the like. The luggage tracking device described in these examples provide a viable locator device for any type of luggage, and may be used in most any type of transit. The current location information may be sent to mobile devices such as smartphones or PDA's, laptop or desktop computers, and so on, but may also be sent to airline systems, such as reservation systems, to ensure that the passenger and/or airline knows where the luggage is at almost all times during and after transit.

Figure 5:
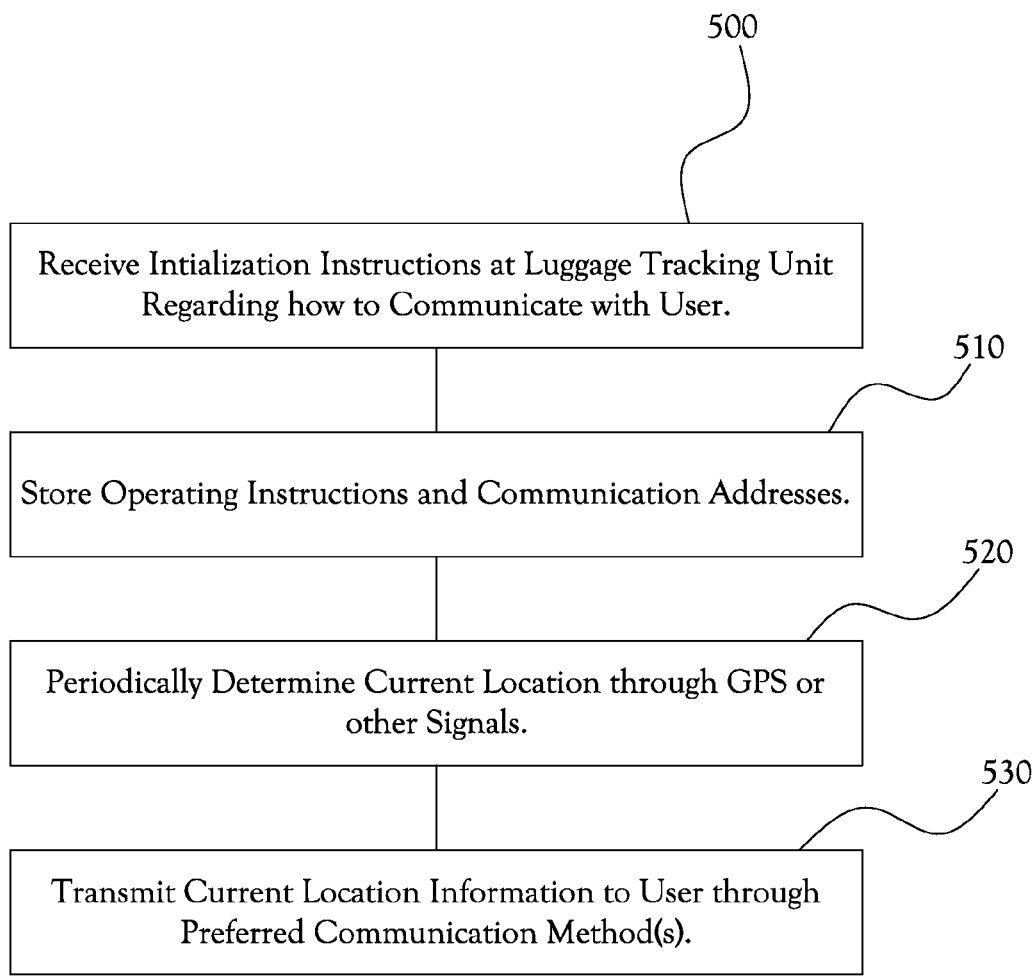
FIG. 5 illustrates operations involved in luggage tracking method according to an example embodiment of the present general inventive concept.

FIG. 5 illustrates operations involved in luggage tracking method according to an example embodiment of the present general inventive concept. In operation 500, a user provides the luggage tracking device with initialization instructions regarding how to communicate with the user. In various example embodiments, these instructions may be provided to the luggage tracking device wirelessly from a mobile device controlled by the user, and include the user's preferred method of receiving location information. For example, the user may instruct the luggage tracking device to determine current location information periodically, or continuously, or when changes in location are determined, and so on, and may instruct the luggage tracking device to transmit the current location information by email, text message, and/or other methods or combinations thereof, and may include sending the information to airline systems so that the airline will also have access to the current location information. In operation 510, the luggage tracking device may store the operating instructions, communication methods/addresses, etc., in a storage. In operation 520, the luggage tracking device may periodically determine the current location of the luggage, such as through GPS or other location identification signals, and in operation 530 the luggage tracking device may transmit, though an accessed network such as the internet, current location information to the user through one or more communication methods preferred by the user. In such a way, the user may be updated as to the location of the baggage without any inquiry by the user, and the user may rest assured that the location of the baggage is readily available.

Thus, various embodiments of the present general inventive concept will serve to provide confidence to the traveling public, allowing real time updates from the airline customer's luggage to the customer. Using GPS or other location determination technology the luggage may be linked to any mobile device and/or computer to give the customer confidence and knowledge as to where the customer's luggage is at all times, or at least periodically. This confidence can improve the traveling experience and eliminate the stress involved with lost luggage. With various example embodiments of the present general inventive concept, customers will no longer wonder when or if their baggage will arrive, as they will know exactly where the luggage is due to the received location information.

Various example embodiments of the present general inventive concept provide customers with smart baggage technology, giving the customer confidence each time they check their luggage, with real time updated information the passenger will know where their luggage is at every stop on their itinerary, making the trip more worry free, whether for business or pleasure. Using a luggage tracking device such as provided by various embodiments of the present general inventive concept, the human element can virtually be taken out of the system of baggage tracking, so that customers can readily receive more instant updates as to the current location of their baggage, and can further improve baggage service on several fronts. With the use of location technology such as GPS, the user of the present general inventive concept can know the location of the baggage and expedite the retrieval of the baggage faster than the services available from the airlines.

According to various example embodiments of the present general inventive concept, baggage to the customer's personal itinerary, which is valuable because due to any irregular operations, cancelled flights, bad weather delays, or other similar changes in the customer's itinerary, the baggage may automatically be rerouted to the customer when the system is employed by the airline. If a bag does not arrive with the customer he or she can file a bag claim right from their cell phone, laptop, or similar device, and not have to wait in long lines or even have to talk to an airline employee, which can save time and provide a much more efficient process for the customer. When the baggage claim is closed by the airlines the customer may be alerted by a delivery notice, letting the customer be worry free and not having to deal with the airline's central baggage system.

As discussed herein, modern airlines are a service industry that is mired with complaints due to many factors, but one of the most common complaints are those concerning delayed or lost baggage. Some customers often feel that the airlines lie to them regarding the location of their baggage, and the present general inventive concept may aid in removing some of the fear and apprehension as to where the customer's bag is at any given time of transit. One can imagine how confident a customer my feel when traveling if the customer knows where his or her luggage is at any time during the trip. As the airlines have begun to charge customers for the carriage of their luggage, and without any changes to their baggage policy or any guarantee that the baggage will arrive at the customer's destination, the present general inventive concept may change the was airlines themselves do business.

As a security feature airlines have a policy called "positive bag match." This policy states that a customer's checked bag must travel with them on the first leg of the customer's itinerary. The goal of every airline is 100% positive bag match, but due to a number of factors that goal is rarely met. The present general inventive concept can be used by the customers and/or airlines to meet that goal. Thus, with information at the customer's fingertips regarding baggage location, the speed and efficiency of baggage location can be improved over what the airlines are capable of doing without such technology as the present general inventive concept. The location technology of the present general inventive concept can be linked up with an airline's reservation system, which will aid in the goal of positive bag match. If a passenger changes his or her itinerary, the luggage tracking device may send a signal that shows that the customer and luggage are no longer on the same flight, and the baggage may be re-routed, or simply taken off the aircraft. Thus, the present general inventive concept may be used to work with the Department of Homeland Security such that GPS information regarding individuals on the "no fly list" may be updated.

It is noted that the simplified diagrams and drawings do not illustrate all the various connections and assemblies of the various components, however, those skilled in the art will understand how to implement such connections and assemblies, based on the illustrated components, figures, and descriptions provided herein, using sound engineering judgment.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

While the present general inventive concept has been illustrated by description of several example embodiments, it is not the intention of the applicant to restrict or in any way limit the scope of the inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings.

The invention claimed is:

1. A luggage tracking device comprising:
   a housing configured to be attached to a piece of luggage;
   a location unit provided in the housing to determine a current location of the device;
   a transmitter provided in the housing and configured to transmit current location information at programmed intervals predetermined by a user; and
   a controller provided in the housing to control operations of the location unit and transmitter.

2. The luggage tracking device of claim 1, wherein the location unit includes a receiver configured to obtain Global Positioning System (GPS) information.

3. The luggage tracking device of claim 1, wherein the location unit includes a receiver configured to obtain location information through a wireless communication with an external transmitter local to the device.

4. The luggage tracking device of claim 3, wherein the receiver communicates with the external transmitter through Bluetooth or Wi-Fi.

5. The luggage tracking device of claim 1, wherein the controller controls the transmitter to transmit the current local information through a local and/or wide area network connection.

6. The luggage tracking device of claim 1, further comprising a battery to provide power to the controller, transmitter, and location unit.

7. The luggage tracking device of claim 1, wherein the housing is configured to open to provide access to components located inside the housing.

8. The luggage tracking device of claim 1, further comprising a coupling member to couple the device to the piece of luggage.

9. The luggage tracking device of claim 8, wherein the coupling member is configured to be locked and unlocked by a user.

10. The luggage tracking device of claim 1, wherein the housing includes a transparent portion provided at least one side through which to display identification information.

11. The luggage tracking device of claim 1, further comprising a storage to store user selected communication instructions.

12. A method of tracking luggage using a wireless luggage tracking device, the method comprising:
   storing contact information in the luggage tracking device regarding a user selected mode of communication;
   determining current location information of the luggage tracking device; and
   transmitting the current location information to the user according to the selected mode of communication and programmed intervals predetermined by a user.

13. The method of claim 12, wherein the determining of the current location information occurs at periodic intervals selected by the user.

14. The method of claim 12, wherein the determining of the current location information occurs continuously.

15. The method of claim 12, wherein the transmitting of the current location information occurs at periodic intervals selected by the user.

16. The method of claim 12, wherein the transmitting of the current location information occurs in response to the luggage tracking device determining a change in the current location.

17. The method of claim 12, further comprising transmitting the current location information to one or more airline systems.

18. The method of claim 12, wherein the current location information is transmitted by email, SMS text, automated telephone call, or any combination thereof.

19. The method of claim 12, wherein the determining of the current location information comprises receiving and processing GPS signals to determine longitude/latitude coordinates, a street address, an airport code, or any combination thereof.

20. The method of claim 12, wherein the determining of the current location information comprises receiving and processing location information from a local airport network to determine longitude/latitude coordinates, a street address, an airport code, or any combination thereof.

* * * * *